United States Patent
Meyer et al.

(10) Patent No.: US 11,616,903 B2
(45) Date of Patent: Mar. 28, 2023

(54) METHOD AND SYSTEM FOR ASSISTING A USER WHO IS LOOKING AT A SCREEN OF A USER DEVICE

(71) Applicant: 4tiitoo GmbH, Munich (DE)

(72) Inventors: Tore Meyer, Munich (DE); Stephan Odorfer, Neubiberg (DE)

(73) Assignee: 4tiitoo GmbH, Munich (DE)

( * ) Notice: Subject to any disclaimer, the term of this patent is extended or adjusted under 35 U.S.C. 154(b) by 0 days.

(21) Appl. No.: 17/169,173

(22) Filed: Feb. 5, 2021

(65) Prior Publication Data

US 2022/0256094 A1     Aug. 11, 2022

(51) Int. Cl.
  *H04N 5/232* (2006.01)
  *H04N 7/14* (2006.01)
  *G06F 3/01* (2006.01)

(52) U.S. Cl.
  CPC ....... *H04N 5/232127* (2018.08); *G06F 3/013* (2013.01); *H04N 5/23219* (2013.01); *H04N 7/144* (2013.01)

(58) Field of Classification Search
  CPC ........... G06F 3/0481; G06F 3/01; G06F 17/30
  USPC ........ 348/14.07, 333.01, 345, 346, 349, 364
  See application file for complete search history.

(56) References Cited

U.S. PATENT DOCUMENTS

| 7,603,657 B2* | 10/2009 | Gassner .................... G06F 9/06 717/113 |
| 2009/0273562 A1* | 11/2009 | Baliga .................... G06F 3/013 345/157 |

FOREIGN PATENT DOCUMENTS

| EP | 3015953 | * 10/2014 | ............... G06F 3/01 |
| EP | 3015953 | *  4/2016 | ........... G06F 3/0481 |
| EP | 3015953 |    5/2016 | |

* cited by examiner

*Primary Examiner* — Yosef K Laekemariam
(74) *Attorney, Agent, or Firm* — ALG Intellectual Property, LLC

(57) ABSTRACT

A method for assisting a user, who is looking at a screen of a user device, to focus on a camera region of the screen includes receiving image data of the user, the image data being captured by a camera of the user device arranged to the screen close to the camera region; determining user input data indicative of that the user wants assistance to focus on the camera region; determining, based on the user input, gaze tracking data of the user looking at the screen, wherein the gaze tracking data are representative for a gaze area on the screen, at which the user is looking at a time of the user input or shortly before the user input; and displaying a screen content in the gaze area of the screen in the camera region.

20 Claims, 2 Drawing Sheets

METHOD AND SYSTEM FOR ASSISTING A USER WHO IS LOOKING AT A SCREEN OF A USER DEVICE

BACKGROUND INFORMATION

Nowadays visual communication via the internet, e.g. video-calls, online-customer-pitches and online-meetings, webinars, online-presentations, e.g. online conferences, live and/or recorded become more and more important. During such visual online communications or when watching records of them similar principles apply as for personal discussions. For example, if a user participating in such a communication via a user device having a screen and a camera wants to give the person or the persons, to whom he or she is talking, a good feeling of being valued, recognized and respected, it is very important to regularly have eye contact with the other person(s) and to keep this eye contact for some while. However, a screen content, which may be important for the communication, often is displayed in a screen area far away from the camera. Therefore, if the user looks at the screen content, eye contact is not possible, and the other person(s) may get the bad feeling that the user is distracted and not focused on the discussion. This may be counterproductive regarding the outcome of the communication the user would like to have.

Further, eye tracking devices are known, which enable to automatically recognize, at which area of a screen a user is currently looking at, the so-called gaze area. In addition, it is known to trigger one or more functions of the user device by looking in a certain area of a screen for a given duration, e.g. an area in which a button is displayed.

For example, EP 3 015 953 A1 describes a method for detecting objects on a screen a person has interest in interacting with.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the FIG.s.

DETAILED DESCRIPTION

Figure 1:
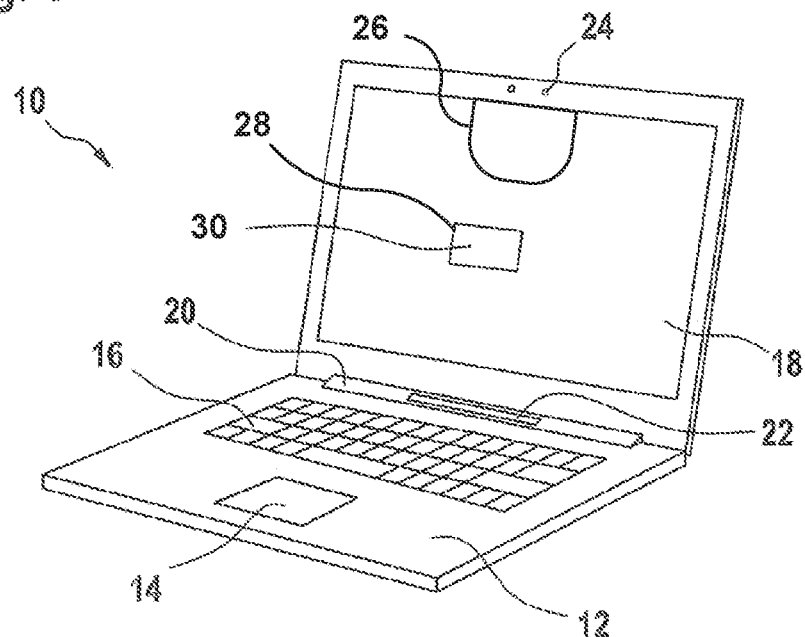
FIG. 1 shows a user device according to an embodiment in a first state.

Described herein are a method, a non-transitory computer readable medium storing a computer program, a user device, and a system, for assisting a user, who is looking at a screen of a user device, to focus on a camera region of the screen.

Embodiments described herein provide a method, a non-transitory computer readable medium storing a computer program, a user device and a system for assisting a user, who is looking at a screen of a user device and who has a visual online communication with another person or persons via the user device, to give the other person(s), to whom the user is talking, a good feeling of being valued, recognized and respected.

Embodiments described herein also provide a method, a non-transitory computer readable medium storing a computer program, a user device and a system for enabling a user, who is looking at a screen of a user device, to focus on a screen content on the screen, while having a valued and respectful visual online communication with another person or persons via the user device.

These embodiments are achieved by the subject-matter of the independent claims. Further exemplary embodiments are evident from the dependent claims and the following description.

An aspect relates to a method for assisting a user, who is looking at a screen of a user device, to focus on a camera region of the screen, the method comprising: receiving image data of the user, by a computing unit of the user device, wherein the image data have been captured with a camera of the user device arranged to the screen close to the camera region; determining, by the computing unit, user input data indicative of that the user wants assistance to focus on the camera region; and, if it is determined based on the user input data that the user wants to have assistance to focus on the camera region, determining gaze tracking data of the user looking at the screen, wherein the gaze tracking data are representative for a gaze area on the screen, at which the user is looking at a time of the user input or shortly before the predetermined user input; and displaying a screen content displayed in the gaze area of the screen in the camera region such that the user is able to look at the screen content in the camera region and to focus on the camera region simultaneously.

Displaying the screen content, which was displayed outside the camera region within the gaze area and at which the user initially was looking, in the camera region causes the user to look at and to focus on the camera region. Then, the person(s) the user is communicating with gets the impression that the user is looking at him or her. This gives the corresponding person a good feeling of being valued, recognized and respected. In addition, the user is able to look at the screen content of interest while maintaining an appreciative and respectful communication with the other person or, respectively, persons.

Although the online-communication may be directed to one or more persons, it is only referred to one person in the following for reasons of simplification. However, the present embodiments are not delimited to the communication with only one person and may be used for the communication with two or more persons. Similarly, although the present embodiments refer to live and/or recorded online-communications, it is only referred to live online-communications person in the following for reasons of simplification. However, the present embodiments are not delimited to the live communications and may used for recorded communications also.

The camera region is configured such that the person the user is communicating with gets the impression that the user is looking at him or her, if the user looks at the camera region. The size, form and/or position of the camera region may be empirically determined by the manufacturer of the user device, a gaze tracking device and/or the camera, or by the provider of the software corresponding to the above method in advance. Alternatively or additionally, the size, the form and/or the position of the camera region may be adjusted by the user, e.g. in corresponding settings.

It may be that the screen content in the gaze area, which is displayed in the camera region, represents data, which is displayed shortly before the user generates the predetermined user input. Shortly before may mean a specific time period, but also an indicator for interest, which was detected, when the user looks at the gaze area, may be determined. Such an indicator for interest may be a fixation of the user.

The camera of the user device is arranged next to the screen close to the camera region. For example, the camera is arranged above, besides or below the camera region, wherein the camera region is smaller than the screen. The camera may be integrated into or attached to the user device. The camera may be a part of the gaze tracking device.

The gaze tracking device may be integrated into the user device or may be an external device regarding the user device. For example, the gaze tracking device may be connected to the user device. The gaze tracking device is configured to determine at which part of the screen the user is looking at the time of the user input or shortly before the predetermined user input. In some embodiments, the camera is not only used for capturing an image of the user represented by the image data for transfer to the other person, but also for capturing the image data, from which the gaze tracking data are derived. Alternatively, the gaze tracking device comprises a gaze tracking camera for capturing further image data, from which the gaze tracking data are derived. The gaze tracking device may comprise a light source for emitting a light beam towards the eyes of the user, wherein a reflection of the light beam in the eyes may be captured by the camera or by the gaze tracking camera in order to determine the gaze tracking data.

The computing unit may be a part of the user device, e.g. a processor of the user device. The computing unit may be a part of the gaze tracking device. The computing unit may comprise a memory for storing data.

The gaze area is determined by the initial gaze of the user at the time of the user input. The gaze area defines the screen content, at which the user initially is looking. The size and/or the form of the gaze area may be empirically determined by the manufacturer of the user device and/or the gaze tracking device, or by the provider of the software corresponding to the above method in advance. Alternatively or additionally, the size and/or the form of the gaze area may be adjusted by the user, e.g. in corresponding settings.

If the screen content is a screen window or a part of a screen window, the whole screen window or only the part of the screen window may be displayed in the camera region. That the screen content, which initially was displayed in the gaze area of the screen, is displayed in the camera region may mean that the screen content is copied or shifted to the camera region.

According to an embodiment, the camera region comprises a position at which the camera is attached to the screen. In other words, the position of the camera overlaps the camera region. This contributes to that that the person the user is communicating with gets the impression that the user is looking at him or her, if the user looks at the camera region. For example, if the camera principally is detachable, the camera may be attached at least in part in the camera region or the camera region may be shifted towards the attached camera by the user. Alternatively, the camera may be embedded into the screen and the camera region may overlap the camera.

According to an embodiment, the camera region is arranged adjacent the camera. This contributes to that that the person the user is communicating with gets the impression that the user is looking at him or her, if the user looks at the camera region. For example, the camera region is that area of the screen closest to the camera. For example, if the camera principally is detachable, the camera may be attached at least in part close to the camera region or the camera region may be shifted towards the attached camera by the user in advance. If the camera is integrated in the user device, the form and/or the position of the camera region may be fixed. The camera region is smaller than the whole area of the screen.

According to an embodiment, the gaze tracking data are determined from the image data by the computing unit. This contributes to a determine the gaze tracking data in a simple and cheap way.

According to an embodiment, the method further comprises streaming the image data of the person to the gaze tracking device; determining, by the gaze tracking device, the gaze tracking data from the image data; and sending the gaze tracking data determined from the image data to the computing unit. This enables to reduce the load of the computing unit and/or to provide the gaze tracking device as an external device. The gaze tracking device may be a component of the user device or of an external device. The image data may be captured by the camera of the user device.

According to an embodiment, the method further comprises capturing further image data of the user by a gaze tracking device; determining, by the gaze tracking device, the gaze tracking data from the further image data; and sending the gaze tracking data determined from the further image data to the computing unit. This enables to reduce the load of the computing unit and/or to provide the gaze tracking device as an external device. The gaze tracking device may be a component of the user device or of a further device. The gaze tracking device may comprise the gaze tracking camera for capturing the further image data.

According to an embodiment, the user input data are determined at least from one of the image data, the gaze tracking data and input data received from an input device. For example, the caption of the gaze tracking data is triggered, when the gaze area overlaps a predetermined button or any screen contend displayed on the screen and is unchanged for a given duration or longer. Alternatively, the caption of the gaze tracking data may be triggered, if the user makes an input via the input device. For example, the user device may be a track pad, a keyboard, a microphone, the camera, the gaze tracking camera, a 3D gesture camera, a brainwave detection device, etc. of the user device or another device connected to the user device. If the input is given via a microphone, the input may be recognized by means of audio analysis, e.g. a click and/or speech recognition software.

It is understood that features, embodiments and/or advantages of the method as described above and in the following may be features of the non-transitory computer readable medium storing the computer program, the user device and/or the system as described in the following, and vice versa.

Further aspects described herein relate to a non-transitory computer-readable medium storing instructions that, when executed, direct a processor of a computing device to perform any of the operations described herein.

A non-transitory computer-readable medium may be a memory, e.g. a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code.

Further aspects described herein relate to the user device. The user device may be arranged for assisting the user, who is looking at the screen of the user device, to focus on the camera region of the screen. The user device comprises the camera arranged to the screen close to the camera region and is configured for capturing the image data of the user; the screen being configured for displaying the screen content to the user and comprising the camera region; the computing unit being configured for determining the user input data indicative of that the user wants assistance to focus on the camera region, and, if it is determined based on the user input data that the user wants to have assistance to focus on the camera region, determining gaze tracking data of the user looking at the screen, wherein the gaze tracking data are representative for the gaze area on the screen, at which the user is looking at the time of the user input or shortly before the predetermined user input; and displaying the screen content displayed in the gaze area of the screen in the camera region such that the user is able to look at the screen content in the camera region and to focus on the camera region. The camera may be arranged above, besides or below the camera region, wherein the camera region is smaller than the whole area of the screen. The computing unit may include a memory and a processor.

According to an embodiment, the camera region comprises the position at which the camera is attached to the screen.

According to an embodiment, the camera region is arranged adjacent the camera. For example, the camera region may be that area of the screen closest to the camera.

According to an embodiment, the gaze tracking data are determined from the image data by the computing unit.

According to an embodiment, the above user device further comprises the gaze tracking device being configured for capturing further image data of the person; determining the gaze tracking data from the further image data; and sending the gaze tracking data determined from the further image data to the computing unit.

A further aspect relates to a system for assisting the user, who is looking at the screen of the user device, to focus on the camera region of the screen, the system comprising: the above user device; and the gaze tracking device being configured for receiving the image data of the user from the user device, and for determining the gaze tracking data from the image data, and for sending the gaze tracking data determined from the image data to the user device.

A further aspect relates to a system for assisting the user, who is looking at the screen of the user device, to focus on the camera region of the screen, the system comprising: the above user device; and the gaze tracking device being configured for capturing the further image data of the user, and for determining the gaze tracking data from the further image data, and for sending the gaze tracking data determined from the further image data to the user device.

These and other aspects will be apparent from and elucidated with reference to the embodiments described hereinafter.

FIG. 1 shows a user device 10, in particular a user device 10 for assisting a user, who is looking at a screen 18 of the user device 10, to focus on a camera region 26 of the screen 18, in a first state, in accordance with one embodiment.

In general, it may be that more than one user is assist by the user device 10. More than one user may be looking at the screen 18, their eye movements may be tracked, and the method as described above and below may be performed, as long as the users are interested in the same areas, such as the video of the other person speaking, and/or they are looking at the same gaze area.

In the embodiment shown in FIG. 1, the user device 10 is embodied in the form of a laptop. The user device 10 comprises a housing 12, a track pad 14 and a keyboard 16 attached to the housing 12, and a screen 18, which is attached to the housing 12 via a hinge 20. On the hinge 20, a gaze tracking device 22, for example comprising an infrared light source and corresponding sensors (e.g. a gaze tracking camera), is provided. Further, a camera 24 for capturing an image of the user is provided above the screen 18.

Furthermore, the user device 10 comprises a computing unit (not shown in FIGS. 1 and 2) for receiving image data representing the captured image of the user and for determining user input data indicative of that the user wants assistance to focus on the camera region. The computing unit may be a part of the user device 10, e.g. a processor of the user device 10, and/or a part of the gaze tracking device 22. The computing unit may comprise one or more processors and at least one computer-readable medium. The computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. The computer-readable medium may also be a data communication network, e.g. the Internet, which allows downloading a program code. In general, the computer-readable medium may be a non-transitory or transitory medium. The user input data may be input via the track pad 14, the keyboard 16, the camera 24, and/or the gaze tracking device 22.

The camera 24 is arranged next to the screen 18. The camera 24 is arranged above the screen 18. The camera 24 is integrated into the user device 10. Alternatively, the camera 24 may be arranged, attached or integrated besides or below the screen 18 or may be integrated into the screen 18. The camera 24 generates image data representing the image of the user in front of the screen 18.

The screen 18 displays information and/or a person, with whom the user is communicating. The screen 18 comprises a camera region 26 close to the camera 24. The camera region 26 may be visibly marked for the user, e.g. by a visible boundary and/or by a special screen effect, e.g. the camera region 26 may be brightened relative to the screen area outside the camera region 26. Alternatively, the camera region 26 may be hidden for the user. The camera region 26 is configured such that the person the user is communicating with gets the impression that the user is looking at him or her, if the user looks at the camera region 26. The camera region 26 is smaller than the screen 18 and has a semi-oval shape. However, the camera region 26 may have a different shape.

The size, form and/or position of the camera region 26 may be empirically determined by the manufacturer of the user device 10, the gaze tracking device 22 and/or the camera 24, or by the provider of the software corresponding to the above method in advance. Alternatively or additionally, the size, the form and/or the position of the camera region 26 may be adjusted by the user, e.g. in corresponding settings of the camera 24, the gaze tracking device 22 and/or the screen 18. Further, at least some of the information and/or the person are shown as a screen content 30 in a gaze area 28 of the screen 18.

The gaze tracking device 22 is integrated into the user device 10. Alternatively, the gaze tracking device 22 may be an external device regarding the user device 10, e.g. the gaze tracking device 22 may be connected to the user device 10 (see FIG. 3). The camera 24 may be a part of the gaze tracking device 22. In some embodiments, the camera 24 is not only used for capturing an image of the user represented by the image data for transfer to the other person, but also for capturing the image data, from which gaze tracking data for the gaze tracking device 22 are derived. Alternatively, the gaze tracking device 22 comprises the gaze tracking camera (not shown in the figures) for capturing further image data, from which the gaze tracking data may be derived. The gaze tracking device 22 may comprise a light source (not shown in the figures) for emitting a light beam towards the eyes of the user, wherein a reflection of the light beam in the eyes may be captured by the camera 24 or by the gaze tracking camera. The light source may be an infrared light source.

The gaze tracking device 22 is configured to determine at which part of the screen 18 the eyes of the user are looking at the time of a predetermined user input or shortly before (e.g., within a predetermined time period of when the user input is provided) the predetermined user input depending on the corresponding captured image data representing the reflection of the light beam in the eyes of the user. The part of the screen 18, at which the eyes of the user are looking at the time of the predetermined user input, may be referred to as gaze area 28. In other words, the gaze area 28 is determined by the initial gaze of the user at the time of the predetermined user input. The gaze area 28 defines the screen content 30, at which the user initially is looking. The size and/or the form of the gaze area 28 may be empirically determined by the manufacturer of the user device 10 and/or the gaze tracking device 22, or by the provider of the software corresponding to the above method in advance. Alternatively or additionally, the size and/or the form of the gaze area 28 may be adjusted by the user, e.g. in corresponding settings.

Determining the gaze tracking data of the user looking at the screen 18 shortly before the user input may contribute to capture exactly the right moment when the user is looking at the screen content 30, because making the user input frequently changes the gaze area 28 of the user, e.g. when using a key of the keyboard 16 and not typing 10-fingers blind users sometimes look down to the keyboard 16 to search the right key. So, determining the gaze tracking data of the user looking at the screen 18 shortly before the user input may contribute to capture the last point of interest of the user on the screen 18.

For determining the gaze area 28, the gaze tracking device 22 evaluates the image data and generates gaze tracking data, which may be provided to software components running in the user device 10, e.g. in the computing unit. The gaze tracking data may be provided in the form of data points. The user device 10, e.g. the computing unit, is configured to identify the screen content 30 in the gaze area 28 at the time of the user input. Optionally, with the gaze tracking device 22 including the camera 24 and/or the gaze tracking camera, the user device 10 may be used as a natural user input device. In this context, the predetermined user input may be that the user looks at a corresponding input button displayed on the screen 18 for a given duration, e.g. 1 s to 10 s, e.g. 2 s to 5 s. Alternatively or additionally the intention to provide a user input may not be based on a duration but on a gaze pattern analysis, e.g. detecting fixations, e.g. many gaze points around one center or AI-based algorithms that detect interest. Alternatively or additionally, the intention to make an input may be recognized without a corresponding button displayed on the screen 18.

In contrast, in one operating mode every gaze area on the screen 18 may be automatically duplicated when interest is detected in the gaze pattern. Alternatively or additionally, the user input may be input via the track pad 14 and/or the keyboard 16, the camera 24, the gaze tracking camera, a 3D gesture camera, a brainwave detection device, etc. of the user device 10 or another device connected to the user device 10. If the input is given via a microphone, the input may be recognized by means of audio analysis, e.g. a click and/or speech recognition software.

The first state, in which the user device 10 is shown in FIG. 1, is the state of the user device 10 at the time of the predetermined user input. The predetermined user input, in short, the user input, is representative for the user wanting assistance in looking at and focusing the camera region 26.

Figure 2:
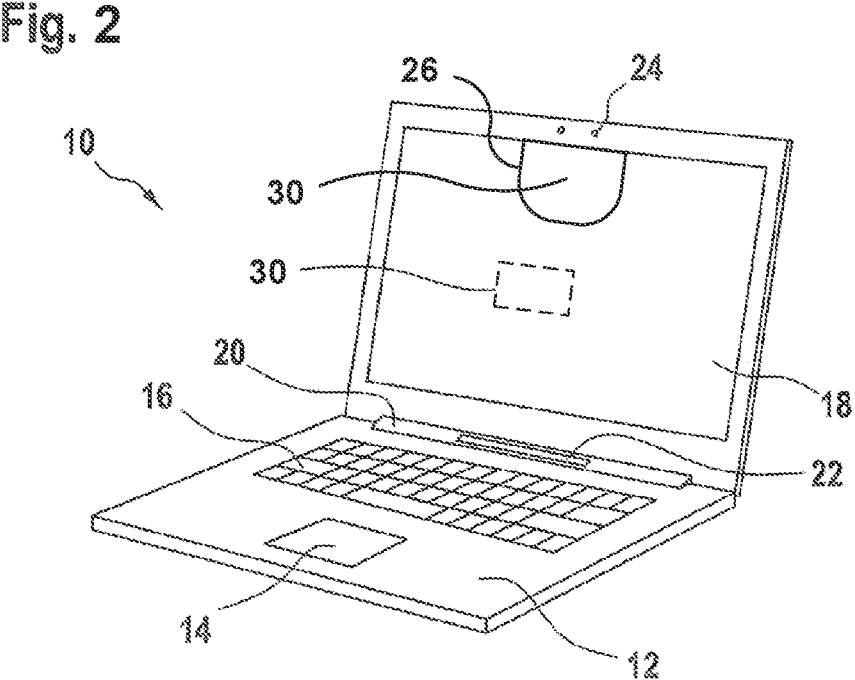
FIG. 2 shows the user device of FIG. 1 in a second state.

FIG. 2 shows the user device 10 of FIG. 1 in a second state. The user device 10 transfers to the second state after receiving the predetermined user input, determining the gaze area 28 and identifying the screen content 30 in the gaze area 28.

In the second state, the user device 10 displays the screen content 30, which initially was shown in the gaze area 28 at the time of the user input, in the camera region 26. That the screen content 30, which initially was displayed in the gaze area 28 of the screen 18, is displayed in the camera region 26 may mean that the screen content 30 may be copied or shifted to the camera region 26. In other words, when the screen content 30 is displayed in the camera region 26, it may still be displayed in the same screen area as before or may be displayed in the camera region 26 only, e.g. depending on the preferences of the user given in the settings. If the screen content 30 is a whole screen window or a part of a screen window, the whole screen window or only the part of the screen window may be displayed in the camera region, e.g. depending on the size and/or the form of the gaze area 28 or depending on corresponding settings. When displaying the screen content 30 in the camera region 26, optionally, the screen content 30 may be adapted to the camera region 26. For example, the screen content 30 may be scaled, e.g. up-scaled or down-scaled, to perfectly fit into the camera region 26.

In the second state, the user is motivated to look at or to focus on the screen content 30 in the camera region 26 such that the person, with whom the user is communicating, has the feeling that the user keeps eye contact with him or her. This gives the person the feeling of being valued and respected by the user.

The user device 10 including the screen 18, the camera 24, and the gaze tracking device 22 may be referred to as system for assisting the user, who is looking at the screen 18 of the user device 10, to focus on the camera region 26 of the screen 18.

Figure 3:
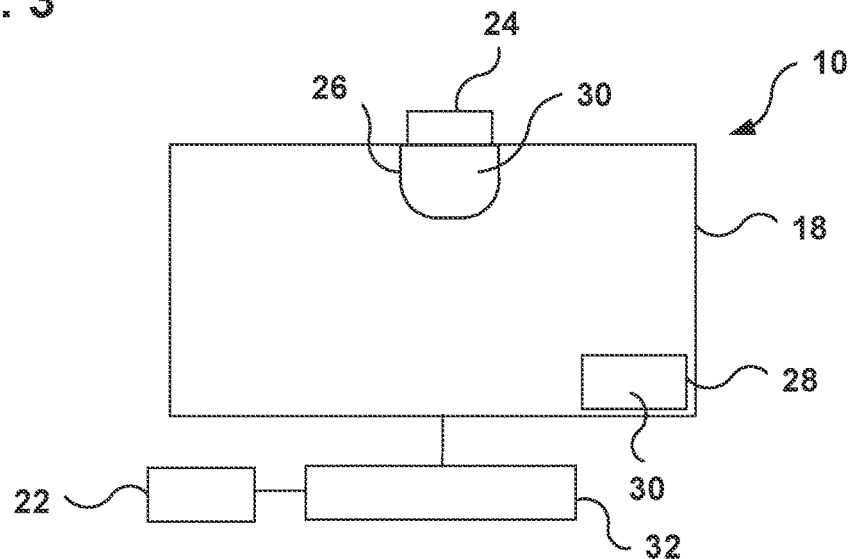
FIG. 3 shows another user device according to an embodiment.

FIG. 3 shows an alternative embodiment of the system for assisting the user, who is looking at the screen 18 of the user device 10, to focus on the camera region 26 of the screen 18. In the embodiment shown in FIG. 3, the screen 18, the gaze tracking device 22, the camera 24, and the computing unit 32 are not integrated in on device and/or in one housing, but are several components connected via wires and/or wireless. Alternatively, at least some of the components may be integrated in the same device and/or housing.

The gaze tracking device 22 of the system may be configured for receiving the image data of the user from the camera 24 and/or the computing unit 32 and determines the gaze tracking data from the image data in response to the predetermined user input. The user input may be input in the computing unit via one of the above-mentioned input means.

Then, the gaze tracking device 22 sends the gaze tracking data determined from the image data to the computing unit 32. The computing unit 32 controls the screen 18 such that the screen content is displayed in the camera region 26.

Alternatively, the gaze tracking device 22 is configured for capturing the further image data of the user by the gaze tracking camera upon the predetermined user input. The user input may be input in the computing unit via one of the above-mentioned input means. Then, the gaze tracking device determines the gaze tracking data from the further image data and sends the gaze tracking data determined from the further image data to the computing unit 32. The computing unit 32 controls the screen 18 such that the screen content 30 is displayed in the camera region 26.

Figure 4:
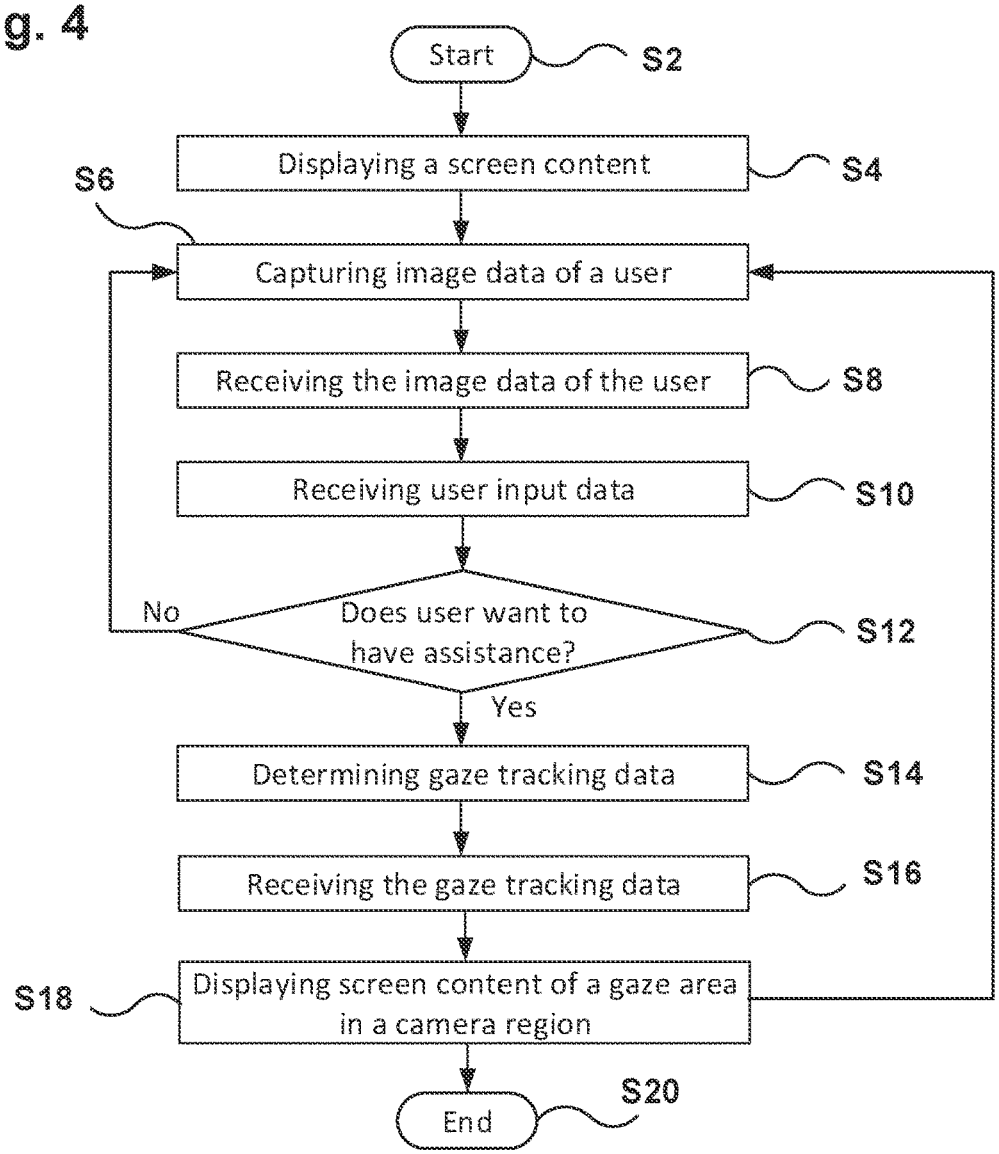
FIG. 4 shows a flow diagram for a method for assisting a user, who is looking at a screen of a user device, to focus on a camera region of the screen, according to an embodiment.

FIG. 4 shows a method for assisting the user, who is looking at the screen of the user device 10, to focus on the camera region 26 of the screen 18, which may be performed by the user device 10 according to FIGS. 1 and 2 or the system according to FIG. 3, in particular by the computing unit 32.

In step S2, the method may be started, e.g. by starting the system and/or the user device 10, or by starting a program for assisting the user, who is looking at the screen 18, to focus on the camera region 26 of the screen 18. In step S2, variables may be initialized. The program may be started automatically or manually. For example, the program may be started, when an online-communication program is started, via which the user communicates with the other person.

In step S4, the screen content 30 is displayed on the screen 18 in a screen area outside of the camera region 26. In addition, an image of the other person may be displayed on the screen. The screen content 30 may comprise the image of the other person or other information, e.g. information which are necessary for the communication with the person. Step S4 may be carried out already before starting the method, in particular independent from the method, permanently during the execution of the method, and/or after carrying out the method.

In step S6, the image of the user is captured by the camera 24. The camera 24 generates the image data and the image data are streamed to the gaze tracking device 22. Alternatively or additionally, the image may be captured by the gaze tracking camera, which generates the image data. The image data are representative for the image of the user. The image data may be transferred to the other person also. Step S6 may be carried out already before starting the method, in particular independent from the method, permanently during the execution of the method, and/or after carrying out the method.

In step S8, the image data of the user are received by the computing unit of the user device 10, by the computing unit 32, both of which are simply referred to as computing unit 32 in the following, or by the gaze tracking device 22. Step S8 may be carried out already before starting the method, in particular independent from the method, permanently during the execution of the method, and/or after carrying out the method.

In step S10, the user input data are determined by the computing unit 32 depending on the predetermined user input, which may be simply referred to as user input in the following. The user input may be indicative of that the user wants assistance to focus on the camera region 26. The user input may be input via the keyboard 16, the track pad 14, and/or the gaze tracking device 22, the camera 24, the gaze tracking camera, a 3D gesture camera, a brainwave detection device, etc. of the user device 10 or another device connected to the user device 10. If the input is given via a microphone, the input may be recognized by means of audio analysis, e.g. a click and/or speech recognition software. For example, if the user wants to have assistance to focus on the camera region 26, the user presses a predetermined key on the keyboard or the track pad 14, and/or focusses a predetermined button displayed on the screen 18. Alternatively or additionally the intention to provide the user input may not be based on the duration but on the gaze pattern analysis, e.g. detecting fixations, e.g. many gaze points around one center or AI-based algorithms that detect interest. Alternatively or additionally, the intention to make the input may be recognized without the corresponding button displayed on the screen 18. In contrast, in one operating mode every gaze area on the screen 18 may be automatically duplicated when interest is detected in the gaze pattern.

In step S12, it is determined whether the user wants to have assistance to focus on the camera region 26 based on the user input data. If it is determined that the user wants to have assistance to focus on the camera region 26, the method proceeds in step S14. If it is determined that the user does not want to have assistance to focus on the camera region 26, the method proceeds in step S6 or, alternatively, in step S4.

In step S14, the gaze tracking data of the user looking at the screen 18 at a time of the user input or shortly before the user input are determined. For determining the gaze tracking data, the gaze tracking device 22 evaluates the image data. The gaze tracking data are representative for the gaze area 28, at which the user is looking at a time of the user input. Thus, the gaze area 28 defines the screen content 30, at which the user initially is looking. Determining the gaze tracking data of the user looking at the screen 18 shortly before the user input, such as 0.1 to 2 s, e.g. 0.2 to 0.5 s, before the user input, may contribute to capture exactly the right moment when the user is looking at the screen content 30, because making the user input frequently changes the gaze area 28 of the user, e.g. when using a key of the keyboard 16 and not typing 10-fingers blind users sometimes look down to the keyboard 16 to search the right key. So, determining the gaze tracking data of the user looking at the screen 18 shortly before the user input may contribute to capture the last point of interest of the user on the screen 18.

The gaze tracking data may be provided to software components running in the user device 10, e.g. in the computing unit 32. The gaze tracking data may be determined already before starting the method, in particular independent from the method, permanently during the execution of the method, and/or after carrying out the method.

In step S16, the gaze tracking data representing the gaze area 28 are received by the computing unit 32. Then, the computing unit 32 may identify the screen content 30 displayed in the gaze area 28. The gaze tracking data representing the gaze area 28 may be received by the computing unit 32 already before starting the method, in particular independent from the method, permanently during the execution of the method, and/or after carrying out the method.

In step S18, the screen content 13 displayed in the gaze area 28 of the screen 18 is displayed in the camera region 26, such that the user is able to look at the screen content 30 in the camera region 26 and to focus on the camera region 26 simultaneously. If the screen content 30 is a screen window or a part of a screen window, the whole screen window or only the part of the screen window may be displayed in the camera region 26, e.g. depending on the size and/or the form of the gaze area or depending on corresponding settings.

That the screen content 30, which initially was displayed in the gaze area 28 of the screen 18, is displayed in the camera region 26 may mean that the screen content 30 is copied or shifted to the camera region 26. In other words, if the screen content is displayed in the camera region 26, it may still be displayed in the same screen area as before or may be displayed in the camera region 26 only, depending on the preferences of the user.

After carrying out step S18 the method may proceed in steps S6, S4, or S20.

In step S20, the method is stopped, e.g. by a corresponding user input.

While the embodiments have been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 user device
12 housing
14 track pad
16 keyboard
18 screen
20 hinge
22 gaze tracking device
24 camera
26 camera region
28 gaze area
30 screen content
32 computing unit
S2 to S20 steps two to twenty

What is claimed is:

1. A method for assisting a user, who is looking at a screen of a user device, to focus on a camera region of the screen, the method comprising:
   receiving, by a computing unit, image data of the user, the image data being captured by a camera of the user device arranged to the screen close to the camera region;
   determining, by the computing unit, user input data indicative of that the user wants assistance to focus on the camera region;
   determining, by the computing unit based on the user input, gaze tracking data of the user looking at the screen, wherein the gaze tracking data are representative for a gaze area on the screen, at which the user is looking at a time of the user input or shortly before the user input; and
   displaying, by the computing unit, a screen content in the gaze area of the screen in the camera region, wherein the screen content, which initially was displayed in the gaze area of the screen, is copied or shifted to the camera region, such that the user is able to look at the screen content in the camera region and to focus on the camera region simultaneously,
   wherein the camera region is configured such that, after the screen content is copied or shifted to the camera region, an additional user viewing the image data by way of an additional user device has an impression that the user of the user device is looking into the camera.

2. The method of claim 1, wherein the camera region comprises a position at which the camera is attached to the screen.

3. The method of claim 1, wherein the camera region is arranged adjacent the camera.

4. The method of claim 1, wherein the gaze tracking data are determined from the image data by the computing unit.

5. The method of claim 1, further comprising:
   streaming the image data of the user to a gaze tracking device;
   determining, by the gaze tracking device, the gaze tracking data from the image data; and
   sending the gaze tracking data determined from the image data to the computing unit.

6. The method of claim 1, further comprising:
   capturing further image data of the user by a gaze tracking device;
   determining, by the gaze tracking device, the gaze tracking data from the further image data; and
   sending the gaze tracking data determined from the further image data to the computing unit.

7. The method of claim 1, wherein the user input data is determined at least from one of the image data, the gaze tracking data, or input data received from an input device.

8. A system, comprising:
   a camera configured for capturing image data from a user of a user device;
   a screen being configured for displaying a screen content to the user and comprising a camera region close to the camera; and
   a computing unit being configured for:
      determining user input data indicative of that the user wants assistance to focus on the camera region;
      determining, based on the user input data, gaze tracking data of the user looking at the screen, wherein the gaze tracking data are representative for a gaze area on the screen, at which the user is looking at a time of the user input or shortly before the user input; and
      displaying the screen content displayed in the gaze area of the screen in the camera region, wherein the screen content, which initially was displayed in the gaze area of the screen, is copied or shifted to the camera region, such that the user is able to look at the screen content in the camera region and to focus on the camera region,
   wherein the camera region is configured such that, after the screen content is copied or shifted to the camera region, an additional user viewing the image data by way of an additional user device has an impression that the user of the user device is looking into the camera.

9. The system of claim 8, wherein the camera region comprises a position at which the camera is attached to the screen.

10. The system of claim 8, wherein the camera region is arranged adjacent the camera.

11. The system of claim 8, wherein the gaze tracking data is determined from the image data by the computing unit.

12. The system of claim 8, wherein the computing unit is further configured for:

streaming the image data of the user to a gaze tracking device;

determining, by the gaze tracking device, the gaze tracking data from the image data; and sending the gaze tracking data determined from the image data to the computing unit.

13. The system of claim 8, further comprising a gaze tracking device being configured for:

capturing further image data of the user;

determining the gaze tracking data from the further image data; and sending the gaze tracking data determined from the further image data to the computing unit.

14. A non-transitory computer-readable medium storing instructions that, when executed, direct a processor of a computing device to:

receive image data of a user, who is looking at a screen of a user device, to focus on a camera region of the screen, the image data being captured by a camera of the user device arranged to the screen close to the camera region;

determine user input data indicative of that the user wants assistance to focus on the camera region;

determine, based on the user input, gaze tracking data of the user looking at the screen, wherein the gaze tracking data are representative for a gaze area on the screen, at which the user is looking at a time of the user input or shortly before the user input; and display a screen content in the gaze area of the screen in the camera region, wherein the screen content, which initially was displayed in the gaze area of the screen, is copied or shifted to the camera region, such that the user is able to look at the screen content in the camera region and to focus on the camera region simultaneously, wherein the camera region is configured such that, after the screen content is copied or shifted to the camera region, an additional user viewing the image data by way of an additional user device has an impression that the user of the user device is looking into the camera.

15. The non-transitory computer-readable medium of claim 14, wherein the camera region comprises a position at which the camera is attached to the screen.

16. The non-transitory computer-readable medium of claim 14, wherein the camera region is arranged adjacent the camera.

17. The non-transitory computer-readable medium of claim 14, wherein the gaze tracking data are determined from the image data by the processor.

18. The non-transitory computer-readable medium of claim 14, the instructions further configured to direct the processor to:

stream the image data of the user to a gaze tracking device;

determine the gaze tracking data from the image data; and send the gaze tracking data determined from the image data.

19. The non-transitory computer-readable medium of claim 14, the instructions further configured to direct the processor to:

capture further image data of the user by a gaze tracking device;

determine the gaze tracking data from the further image data; and send the gaze tracking data determined from the further image data.

20. The non-transitory computer-readable medium of claim 14, wherein the user input data is determined at least from one of the image data, the gaze tracking data, or input data received from an input device.

\* \* \* \* \*